(12) United States Patent
Kim

(10) Patent No.: US 7,971,085 B2
(45) Date of Patent: Jun. 28, 2011

(54) METHOD AND APPARATUS FOR SUPPLYING POWER, AND DISPLAY DEVICE

(75) Inventor: Won Sik Kim, Daegu (KR)

(73) Assignee: LG Electronics Inc., Seoul (KR)

( * ) Notice: Subject to any disclaimer, the term of this patent is extended or adjusted under 35 U.S.C. 154(b) by 571 days.

(21) Appl. No.: 12/064,532

(22) PCT Filed: Aug. 21, 2006

(86) PCT No.: PCT/KR2006/003275
§ 371 (c)(1),
(2), (4) Date: Feb. 22, 2008

(87) PCT Pub. No.: WO2007/027023
PCT Pub. Date: Mar. 8, 2007

(65) Prior Publication Data
US 2008/0222433 A1    Sep. 11, 2008

(30) Foreign Application Priority Data

Aug. 31, 2005 (KR) ........................ 10-2005-0080694

(51) Int. Cl.
*G06F 1/00* (2006.01)
(52) U.S. Cl. ........................................ 713/324; 307/43
(58) Field of Classification Search .......... 713/300–340; 307/43, 65
See application file for complete search history.

(56) References Cited

U.S. PATENT DOCUMENTS

| | | | | |
|---|---|---|---|---|
| 5,167,024 A * | 11/1992 | Smith et al. | ................... | 713/322 |
| 5,239,495 A * | 8/1993 | Nanno et al. | ................... | 713/321 |
| 5,293,494 A * | 3/1994 | Saito et al. | ..................... | 713/100 |
| 5,423,045 A * | 6/1995 | Kannan et al. | ................ | 713/322 |
| 5,481,299 A * | 1/1996 | Coffey et al. | ................. | 348/173 |
| 5,574,483 A * | 11/1996 | Nishizawa | .................... | 345/556 |
| 5,579,524 A * | 11/1996 | Kikinis | ......................... | 713/324 |
| 5,630,144 A * | 5/1997 | Woog et al. | ................... | 713/310 |
| 5,652,891 A * | 7/1997 | Kitamura et al. | ............ | 713/324 |
| 5,652,893 A * | 7/1997 | Ben-Meir et al. | ............. | 713/310 |
| 5,692,204 A * | 11/1997 | Rawson et al. | ................ | 713/340 |
| 5,710,911 A * | 1/1998 | Walsh et al. | .................. | 713/500 |
| 5,734,919 A * | 3/1998 | Walsh et al. | .................. | 713/300 |
| 5,854,617 A * | 12/1998 | Lee et al. | ...................... | 345/102 |
| 5,878,264 A * | 3/1999 | Ebrahim | ....................... | 713/323 |
| RE36,189 E * | 4/1999 | Carter et al. | .................. | 713/324 |
| 5,944,828 A * | 8/1999 | Matsuoka | ..................... | 713/323 |
| 5,961,648 A * | 10/1999 | Choi et al. | .................... | 713/323 |
| 5,974,551 A * | 10/1999 | Lee | ............................... | 713/300 |
| 6,049,880 A * | 4/2000 | Song | ............................. | 713/300 |
| 6,119,225 A | 9/2000 | Kim | ................................. | 713/1 |

(Continued)

FOREIGN PATENT DOCUMENTS

KR    10-1996-0020582    6/1996

(Continued)

*Primary Examiner* — Paul R Myers
(74) *Attorney, Agent, or Firm* — KED & Associates, LLP

(57) ABSTRACT

A power supply apparatus for a display device includes a power unit for receiving commercial power, converting the commercial power into main power, supplying or cutting off a supply of the main power to the display device, and supplying the main power to a device installed in the display device, a user interface unit for receiving a power control signal from a user, and a control unit for, when the power control signal is inputted, supply or cutting off a supply of the main power to the display device, detecting a power control state of the device, and transmitting the power control signal to the device according to a detected power control state.

26 Claims, 7 Drawing Sheets

U.S. PATENT DOCUMENTS

| | | | |
|---|---|---|---|
| 6,769,070 B1* | 7/2004 | Kawata | 713/324 |
| 6,999,059 B2* | 2/2006 | Kim | 345/102 |
| 7,073,075 B2* | 7/2006 | Freyman et al. | 713/300 |
| 7,484,112 B2* | 1/2009 | Noorbakhsh et al. | 713/340 |
| 7,587,618 B2* | 9/2009 | Inui et al. | 713/320 |
| 2002/0152408 A1* | 10/2002 | Inui et al. | 713/300 |
| 2005/0081072 A1* | 4/2005 | Lee | 713/320 |

FOREIGN PATENT DOCUMENTS

| | | |
|---|---|---|
| KR | 10-1998-085434 | 12/1998 |
| KR | 10-2004-0036301 | 4/2004 |
| KR | 100444991 | 8/2004 |

* cited by examiner

[Fig. 1]
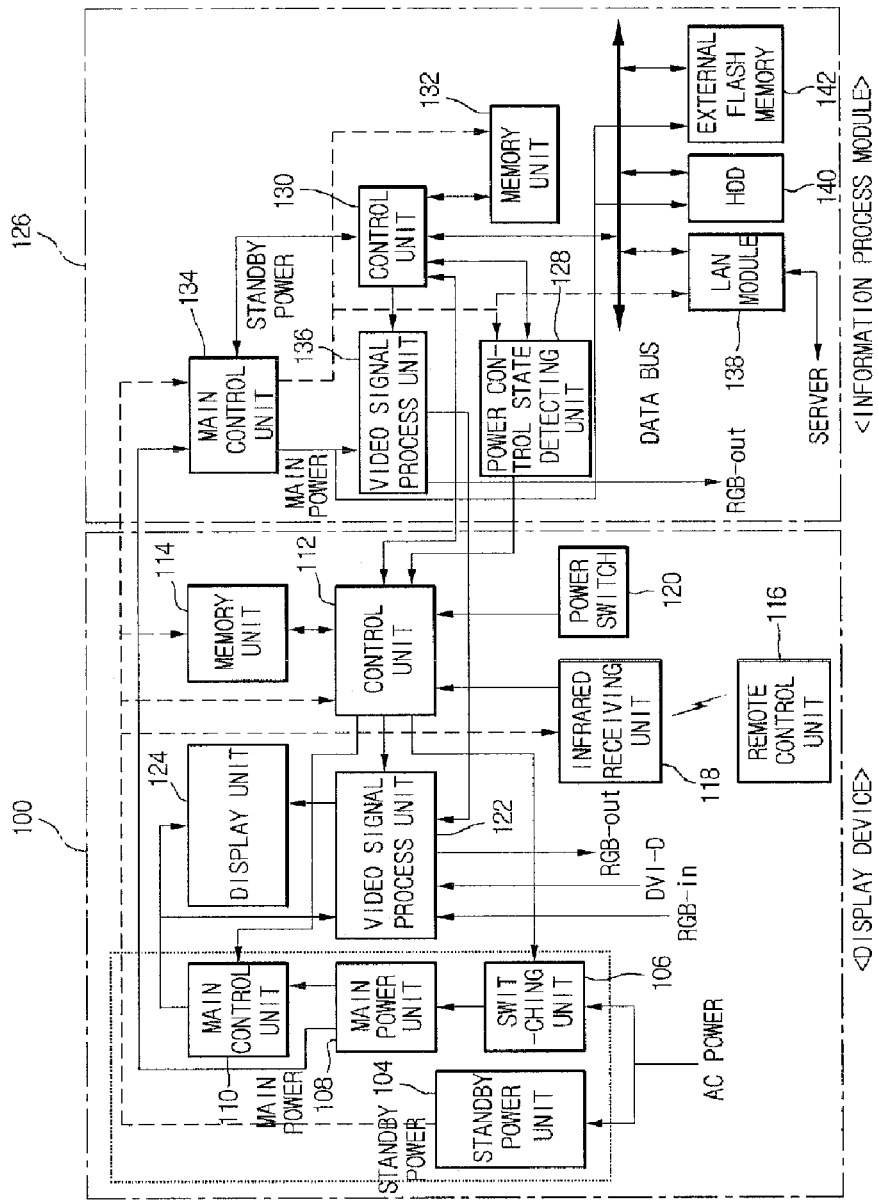
[Fig. 2]
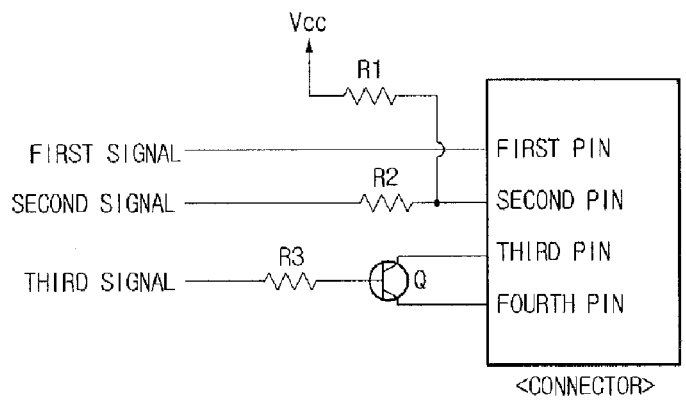

[Fig. 3]
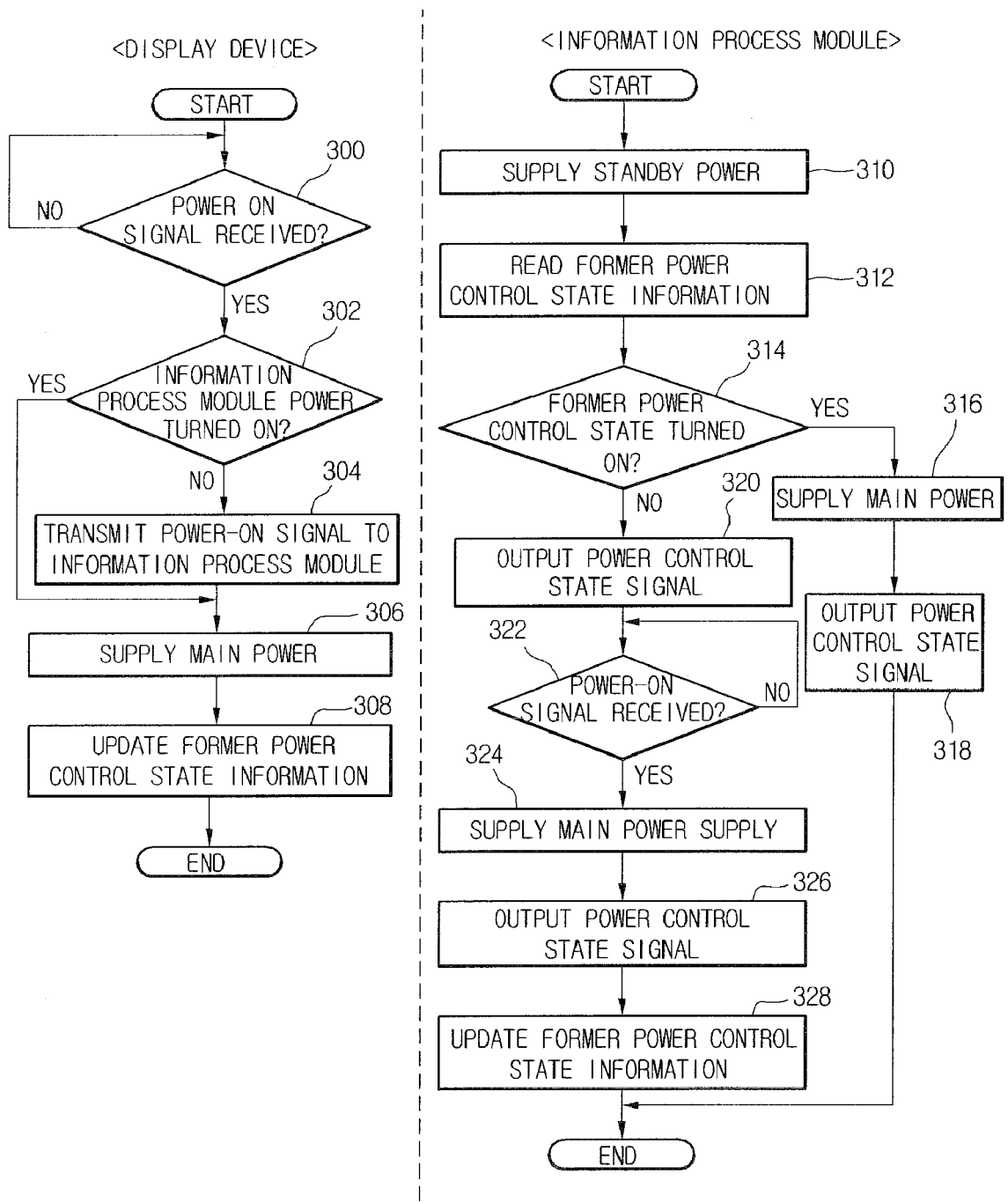

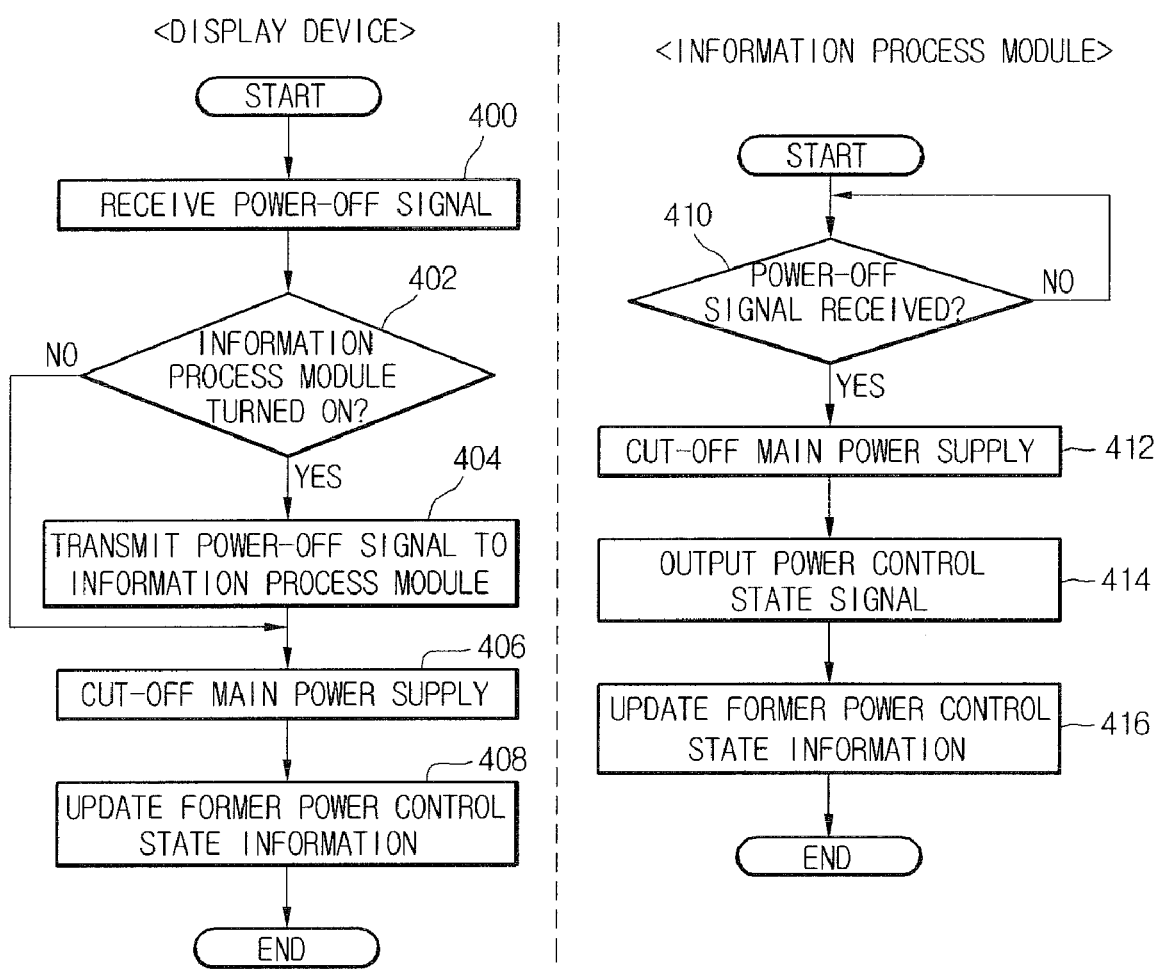
[Fig. 4]

[Fig. 5]
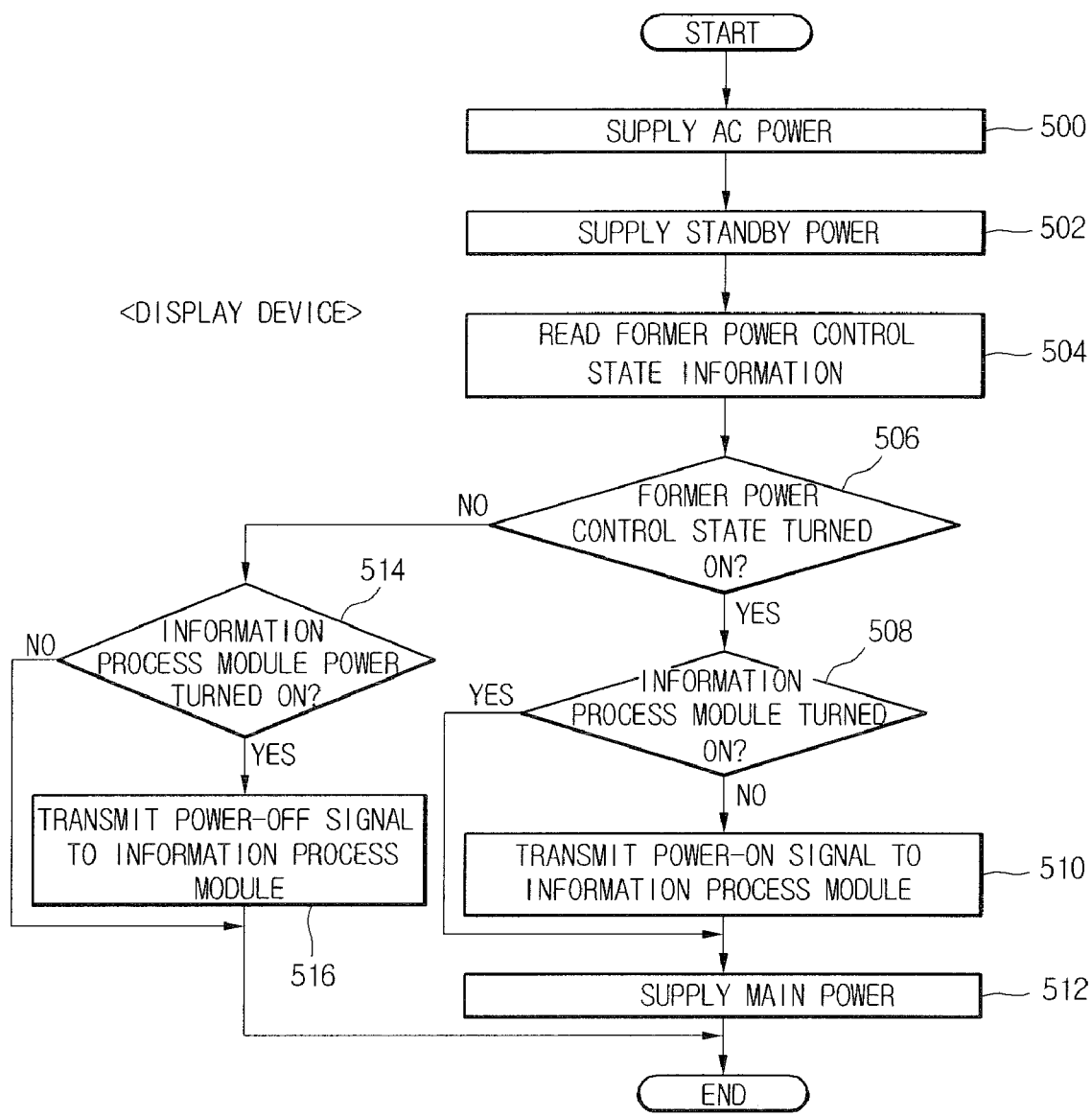

[Fig. 6]
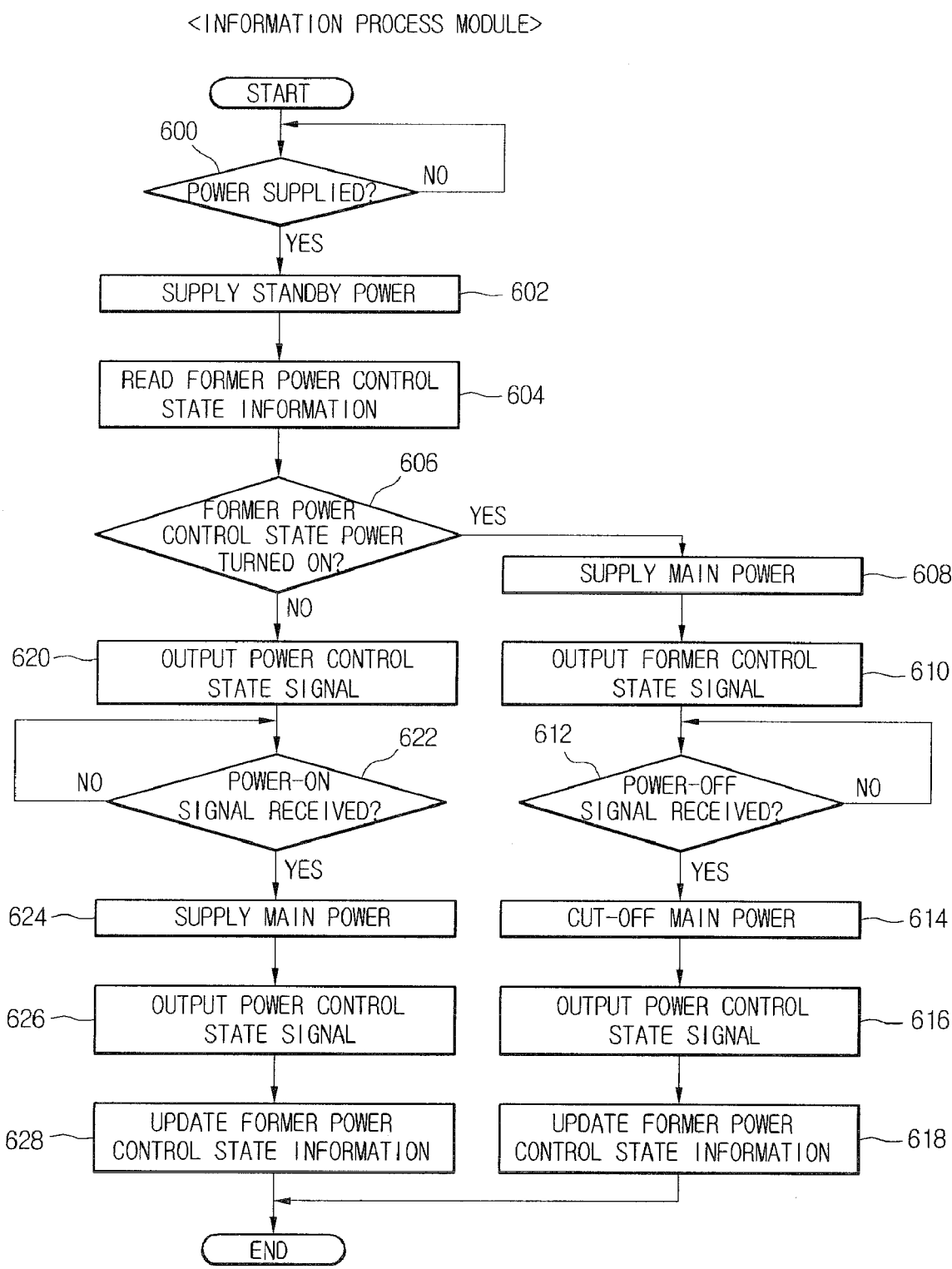

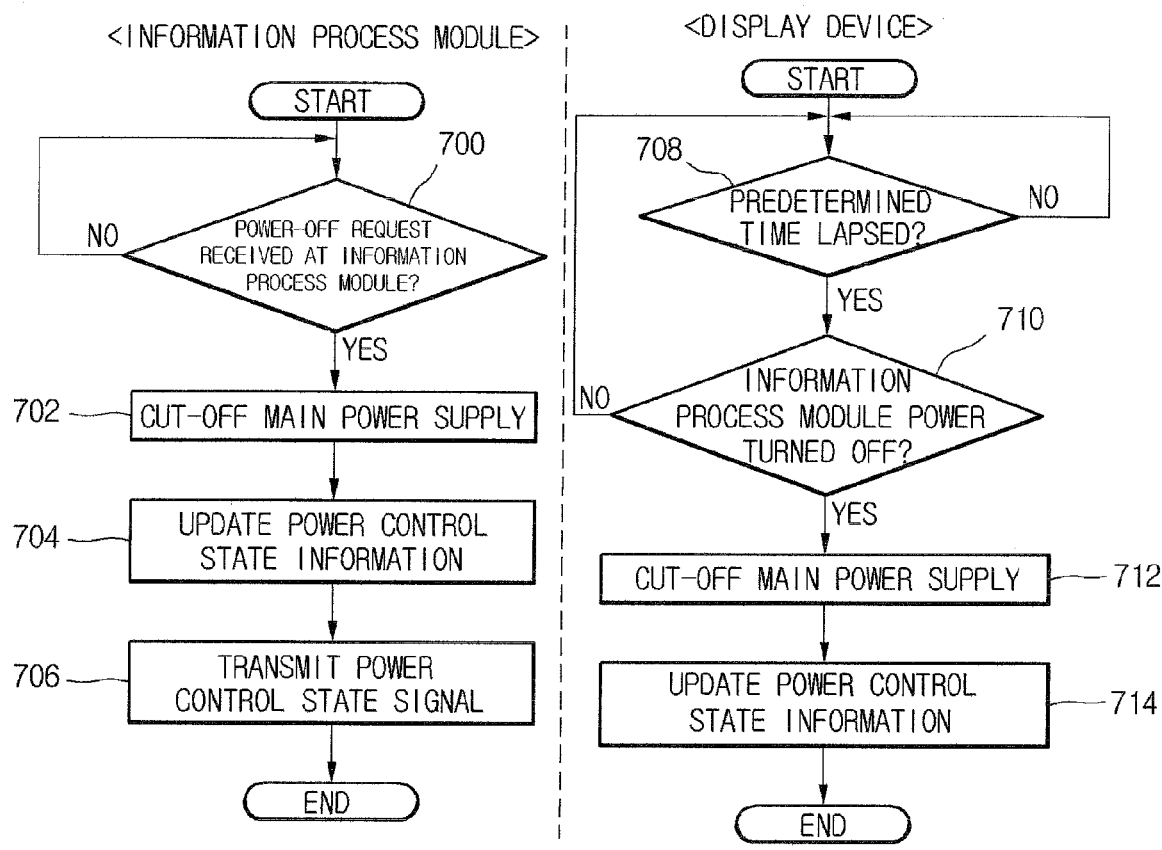
[Fig. 7]

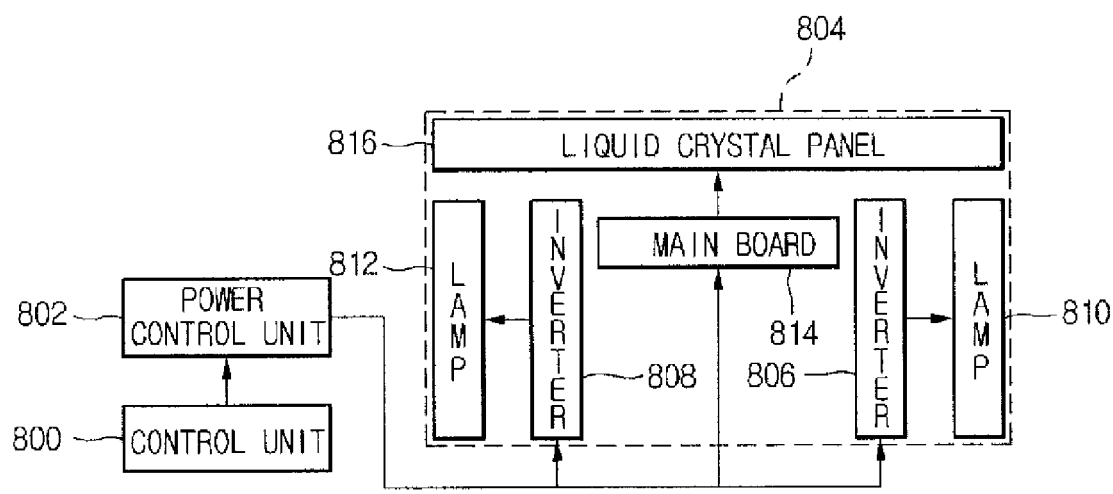
[Fig. 8]
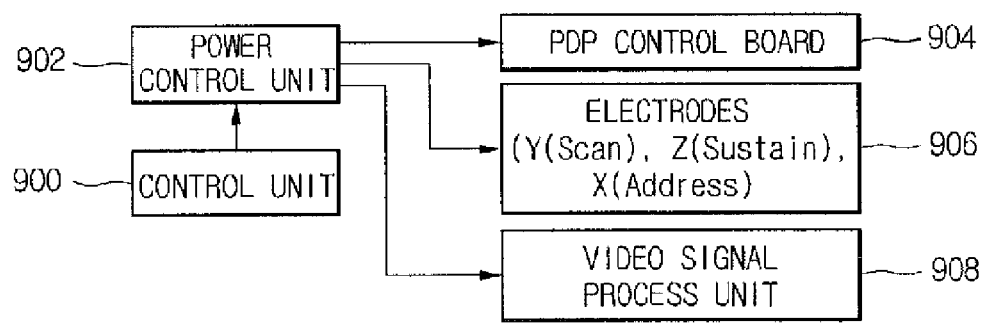
[Fig. 9]

METHOD AND APPARATUS FOR SUPPLYING POWER, AND DISPLAY DEVICE

TECHNICAL FIELD

The present invention relates to a power supply apparatus and method for a display device.

BACKGROUND ART

With the development of a display technology, a variety of display devices has been researched and developed. In recent years, a display device integrated with a personal computer has been developed and commercialized.

In the display device integrated with the computer, a display unit for performing a display function is physically integrated with a computer unit for performing a computing function. However, since the computer has an independent power supply unit, it is difficult to effectively manage the power and to minimize the size of the display device integrated with the computer.

Therefore, it has been endeavored to effectively manage the power and reduce the size of the display device with the computer by integrating the power supply unit of the display device with the computer.

A display device may include a variety of devices having different functions which can be detachably mounted. Since the device is installed in the display device, it is difficult for a user to control the power of the device.

That is, since the device is mounted in the display device and thus a power switch for controlling the power of the device cannot be projected out of the display device, the user cannot directly control the on/off of the power.

Accordingly, when the power control of the device mounted in the display device is independently performed from the display device, it is difficult to control the power of the device according to the user request.

DISCLOSURE OF INVENTION

Technical Problem

An object of the present invention is to provide a power supply apparatus and method that can supply power to a display device and a device that can be detachably mounted in the display device and normally operate the display device and the device by synchronizing the power control states of the display device and the device and a display device having the power supply apparatus.

Another object of the present invention is to provide a power supply apparatus and method that can supply power to a display device and an information process module formed by a device that can be detachably mounted in the display device and normally operate the display device and the information process module by synchronizing the power control states of the display device and the information process module, such an information process module, and a display device having the power supply apparatus.

Another object of the present invention is to provide a power supply apparatus and method that can improve the user convenience by detecting a former power control state when AC power is inputted in a state where the AC power source is turned off and controlling the power of a display device and an information process module in response to the former power control state, such an information process module, and a display apparatus having the power supply apparatus.

Still yet another object of the present invention is to provide a power supply apparatus and method that can reduce the power consumption by, when a power source of the information process module formed by a device that can be detachably mounted in a display device, turning off the display device in response to the power-off of the information process module, such an information process module, and a display apparatus having the power supply apparatus.

Technical Solution

According to an exemplary embodiment of the present invention, there is provided a power supply apparatus for a display device, including: a power unit for receiving commercial power, converting the commercial power into main power, supplying or cutting off a supply of the main power to the display device, and supplying the main power to a device installed in the display device; a user interface unit for receiving a power control signal from a user; and a control unit for, when the power control signal is inputted, supply or cutting off a supply of the main power to the display device, detecting a power control state of the device, and transmitting the power control signal to the device according to a detected power control state.

In another embodiment of the present invention, there is provided a power supply apparatus for a display device, including: a power unit for receiving commercial power, converting the commercial power into main power, supplying or cutting off a supply of the main power to the display device, and supplying the main power to a device installed in the display device; a memory unit for storing a power control state information; and a control unit for controlling the power unit to update the former power control state information whenever the power control state varies and supply the main power to the display device according to the former power control state information stored in the memory unit when the commercial power is inputted.

In still another embodiment of the present invention, there is provided an information process module that is formed in a device type installed in a display device, including: a power control unit receiving main power from the display device and supplying or cutting off the supply of the main power to the information process module; a power control state detecting unit for outputting a power control state signal to an external side; and a control unit for controlling the power control unit to supply or cut off the supply of the main power to the information process module according to the power control signal from the display device and providing the power control state signal corresponding to the main power supply state to the display device through the power control state detecting unit.

In still yet another embodiment of the present invention, there is provided a display device having an information process module, including: a power unit for receiving commercial power, converting the commercial power into main power, supplying or cutting off a supply of the main power to the display device, and supplying the main power to the information process module; a user interface unit for receiving a power control signal from a user; a first control unit for, when the power control signal is inputted, supply or cutting off a supply of the main power to the display device, detecting a power control state of the information process module, and transmitting the power control signal to the information process module according to a detected power control state; and a second control unit for controlling the power control unit to supply or cut off the supply of the main power to the information process module according to the power control signal from the display device and providing the power control state signal corresponding to the main power supply state to the display device.

In still yet another embodiment of the present invention, there is provided a power supply method for a display device, including: controlling power of the display device according to a power control signal inputted; checking a power control state of a device mounted in the display device; and transmitting the power control signal when the power control state of the device does not correspond to the power control signal.

In still yet further another embodiment of the present invention, there is provided a power supply method for a display device, including: reading former power control state information from a memory when commercial power is inputted in a state where the commercial power of the display device is turned off; controlling the power of the display device in response to the former power control state information; and updating the former power control state information in the memory whenever the power control state of the display device varies.

In still yet further another embodiment of the present invention, there is provided a power supply method for an information process module that is formed in a device installed in a display device, the method including: controlling power of the information process module according to a power control signal transmitted from the display device; and providing a power control state signal corresponding to the power control state to the display device through a power controls state detecting unit whenever the power control state varies.

In still yet further another embodiment of the present invention, there is provided a power supply method for a display device in which an information process module is inserted, the method including: controlling power of the information process module and the display device according to a former power control state when power is supplied; controlling, when a power control signal is inputted in the power control state, the power of the display device according to the power control signal and checking a power control state of the information process module; and controlling the power of the information process module according to the power control signal when the power control state of the information process module does not correspond to the power control signal.

Advantageous Effects

According to the present invention, even when one power source is provided, the power source can supply the power to a device that can be detachably mounted in the display device and normally operate the display device and the device.

BRIEF DESCRIPTION OF THE DRAWINGS

FIG. 1 is a view of a display device and an information process system having an information process module according to an embodiment of the present invention;

FIG. 2 is a view of a power control state detecting unit according to the embodiment of the present invention;

FIG. 3 is a flowchart illustrating a power-on process of the display device and the information process module according to the embodiment of the present invention;

FIG. 4 is a flowchart illustrating a power-off process of the display device and the information process module according to the embodiment of the present invention;

FIG. 5 is a flowchart illustrating an automatic power control process according to a former power control state when AC power is inputted in the display device according to the embodiment of the present invention;

FIG. 6 is a flowchart illustrating an automatic power control process according to a former power control state when AC power is inputted in the information process module according to the embodiment of the present invention;

FIG. 7 is a flowchart illustrating a power-off process of the display device and information process module according to the embodiment of the present invention;

FIG. 8 is a view illustrating a power supply process when a liquid crystal display module is used as the display module; and FIG. 9 is a view illustrating a power supply process when a plasma display panel module is used as the display module.

MODE FOR THE INVENTION

A display device according to a preferred embodiment of the present invention will now be described with reference to FIG. 1.

A display device according to the present invention includes a slot (not shown) in which an information process module 126 can be inserted and a connector (not shown) for forming a path for the power supply and communication with the information process module 126. The information process module 126 is mounted in the slot. The information process module 126 is connected to the display device 100 through the connector.

The display device 100 will now be described.

A power source 102 of the display device 100 includes a standby power source 104 receiving a commercial AC power, converting the AC power into standby power of a first electric potential, and outputting the standby power, a main power source 108 receiving the AC power, converting the AC power into main power, and outputting the main power, a switching unit 106 for selectively supplying the AC power to the main power source 108 according to the control of a control unit 112, and a power control unit 110 for supplying the main power outputted from the main power unit 108 to each unit of the display device 100, such as a display unit 124 and a video signal process unit 122 according to the control of the control unit 112.

The standby and main power outputted from the power source 102 is inputted to the power control unit 134 of the information process module 126 and each unit of the display device 100. That is, in the display device 100, the standby power is supplied on the control unit 112, a memory unit 114, and an infrared ray receiving unit 118 and the main power is supplied to the video signal process unit 122 and the display unit 124. In the information process module 126, the standby power is supplied to a control unit 130, a memory unit 132, a power control state detecting unit 128, and an LAN module 138 and the main power is supplied to a video signal process unit 136, a hard disk drive (HDD) 140, and an external flash memory 142.

The control unit 112 generally controls the display device 100 and performs a power control process according to a preferred embodiment of the present invention. That is, when a power on/off signal is inputted through a user interface such as a remote controller 116 or a power switch 120, the control unit 112 controls the power control unit 110 in response to the power on/off signal, detects a power control state of the information process module 126, and transmits a power control signal corresponding to the power on/off signal to the control unit 130 of the information process module 126. When AC power is inputted in a state where the AC power source is turned off, the control unit 112 controls the power control unit 110 according to the former power control state information stored in the memory unit 114, detect the power control state of the information process module 126, and transmits a power control signal to the control unit 130 of the information process module 126 when the power control state of the information process module 126 does not correspond to the former power control state. The control unit 112 detects the power control state of the information process module 126 at a predetermined time interval, and, when the power-off of the information process module 126 is detected, turns off the power of the display device 100 in response to the power-off of the information process module.

The memory unit 114 stores a variety of information containing a process program of the control unit 112 and the former power control state information of the display device 100.

The remote controller 116 includes a plurality of keys and converts and transmits a variety of information and signals inputted from the user into an infrared ray. The infrared ray receiving unit 118 receives the infrared signal from the remove controller 116, converts the infrared signal into an electric signal, and provide the electric signal to the control unit 112. The power switch 120 provides a signal inputted by the manipulation of the user to the control unit 112.

The video signal process unit 122 processes a variety of video signals (DVI-D, RGB-in) inputted from an external side or a video signal inputted from the video signal process unit 136 of the information process module 126 and provides the processed signal to the display unit 124. In addition, the video signal process unit 122 outputs a portion (RGB-out) of the inputted video signals to the external side.

The display unit 124 receives the video signal from the video signal process unit 122 and outputs the video signal to the screen. A variety of display devices such as a liquid crystal display (LCD) module or a plasma display panel (PDP) module can be used as the display unit 124.

The information process module 126 will now be described.

The control unit 130 of the information process module 126 has an operation system such as Windows and performs a process for performing a variety of computing function. The control unit 130 performs a power control coinciding with the control of the display device 100.

Describing the control unit 130 in more detail, when the standby power is supplied, the control unit 130 controls the power control unit 134 in response to the former power control state information stored in the memory unit 132. The control unit 130 controls the power control unit 134 according to a power control signal outputted from the control unit 112 of the display device 100.

The memory unit 132 stores a variety of programs containing a process program as well as the former power control state information.

The video signal process unit 136 processes the video signal according to the control of the control unit 130 and provides the processed signal to the video signal process unit 122 of the display device 100.

The LAN module 138 functions to allow for the communication between the control unit 13 and the server through a dedicated or commercial network. That is, the LAN module 138 receives a video signal from the server and outputs the video signal through the display device 100.

The HDD 140 and the external flash memory 142 provide a storage area for storing a variety of information and a variety of image data.

The power control state detecting unit 128 receives a first signal PC_SENSE rep-resenting a driving state of the control unit 130 from the control unit 130, a second signal BO_SENCE representing a mounting state of the information process module 126, and a third signal PC_CONT representing a power control state that is a main power supply state of the information process module and outputs the first, second and third signals through pins of a connector connected to the display device 100.

Here, the power control state detecting unit 128 will now be described in more detail with reference to FIG. 2.

The power control state detecting unit 128 is connected between pins (first through fourth pins) of the connector connecting the display device 100 and the information process module 126 and the control unit 130 of the information process module 126. Here, the control unit 130 outputs the first, second and third signals PC_SENCE, BO_SENCE and PC_CONT.

The first signal PC_SENCE is directly inputted to the first pin and the second signal BO_SENCE is inputted to the second pin through a protecting resistor R2. At this point, the standby power Vcc is applied between the second pin and the protecting resistor R2 through a protecting resistor R1. Therefore, the power control state detecting unit 128 outputs the first signal PC_SENSE through the first pin of the connector and the second signal BO_SENCE through the second pin of the connector.

The third signal PC_CONT is inputted to a base terminal of a transistor Q1 through a protecting resistor R3. An emitter and collector of the transistor Q1 are respectively connected to third and fourth pins of the connector. The transistor Q1 interconnects or opens the third and fourth pins according to the third signal PC_CONT. Since the third and fourth pins of the connector are interconnected or opened in response to the third signal PC_CONT, the control unit 130 outputs a signal corresponding to the third signal PC_CONT through the third and fourth pins of the connector. In the following description, the signal outputted through the third and fourth pins will be referred as a power control state signal.

Accordingly, the control unit 112 of the display device 100 detects the driving state of the control unit 130 of the information process module 126, the mounting state of the information process module 126, and the power control state of the information process module 126 using the signals outputted through the first to fourth pins of the connector.

A power control method for the display device 100 according to a preferred embodiment of the present invention will now be described.

In the following description, the power control method of the present invention will be described by dividing the process into a power-on process, a power-off process, a power-on process by input of AC power, and a power-off process by the power-off of the information process module.

The power-on process in the standby state of the display device 100 will be described with reference to FIG. 3. A process for the control unit 112 of the display device 100 and a process for the control unit 130 of the information process module 126 will be separately described.

The process of FIG. 3 is performed in the standby state where standby power is supplied to each part of the display device 100 and the information process module 126.

In the state where the main power is not supplied but only the standby power is supplied, the control unit 112 checks if the user transmits a power-on signal through the remote controller 116 or the power switch 120 (Operation 300). When the control unit 112 receives the power-on signal, the control unit 112 detects if the information process module 126 is in the power-on state using the power control state detecting unit 128, i.e., detects if the main power is supplied (Operation 302).

When the information process module 126 is turned on, the control unit 112 supplies the main power to each part of the display device 100, such as the display unit 124 and the video signal process unit 122 (Operation 306). Then, the control unit 112 updates the power control state information of the memory unit 114 to the power-on state (Operation 308).

Unlike the above, when the information process module 126 is in the power-off state, the control unit 112 transmits a power-on signal to the control unit 130 of the information process module 126 (Operation 304) and supplies the main power to each part of the display device 100, such as the display unit 124 and the video signal process unit 122 (Operation 306). Then, the control unit 112 updates the formed power control state information stored in the memory unit 114 to the power-on state (Operation 308).

Meanwhile, when the power is supplied from the power unit 102 of the display device 100 to the information process module 126, the standby power is supplied to each part of the information process module 126, such as the control unit 130, the memory unit 132, and the LAN module 138 (Operation 310).

When the standby power is supplied, the control unit 130 reads the former power control state information from the memory unit 132 (Operation 312). Then, the control unit 130 checks if the former control state information represents the power-on state (Operation 314).

When the former control state information represents the power-on state, the control unit 130 controls the power control unit 134 to supply the main power to each part of the information process module 126, such as the video signal process unit 136, the HDD 140, and the external flash memory 142 (Operation 316). Therefore, the parts of the information process module 126 can normally operate by receiving the main power. When the main power is supplied, the control unit 130 transmits a power control state signal representing the power-on state to the control unit 112 of the display device through the power control state detecting unit 128 (Operation 318).

Unlike the above, when the power control state information represents the power-off state (Operation 314), the control unit 130 transmits the power control state signal to the control unit 112 of the display device 100 through the power control state detecting unit 128 (Operation 320).

That is, when the main power is supplied, the control unit 130 transmits the power control state signal representing the power-on state to the control unit 112 of the display device 100 through the power control state detecting unit 128, and, when the main power is not supplied, the control unit 130 transmits the power control state signal representing the power-off state to the control unit 112 of the display device 100 through the power control state detecting unit 128.

The control unit 130 of the information process module 126 checks if the power-on signal is received from the control unit 112 of the display device 100 (Operation 322). When the power-on signal is received, the control unit 130 controls the power control unit 134 to supply the main power to each part of the information process module 126, such as the video signal process unit 136, the HDD 140 and the external flash memory 142 (Operation 324). Accordingly, the information process module 126 normally operates. When the main power is supplied, the power control state signal representing the power-on is transmitted to the control unit 112 of the display device 100 through the power control state detecting unit 128 (Operation 328).

When the power-on signal is inputted, the display device 100 is turned on and the information process module 126 is also turned on by detecting the power control state of the information process module 126, thereby synchronizing the power control state of the display device 100 and the information process module according to the signal inputted by the user through the display device 100.

A power-off process in a power-on state of the display device 100 will now be described with reference to FIG. 4.

In the power-on state of the display device 100, the control unit 112 checks if there is a power-off signal using the power switch 120 or the remote controller 116 (Operation 400). When the power-off signal is inputted, the control unit 112 detects if the information process module 126 is in the power-on state using the power control state detecting unit 128 of the information process module 126, i.e., if the main power is supplied (Operation 402). When the information process module 126 is in the power-on state, the control unit 112 transmits the power-off signal to the control unit 130 of the information process module 126 (Operation 404), then controls the power control unit 110 to cut off the supply of the main power (Operation 406), and updates the former power control state information stored in the memory unit 114 to the power-off state (Operation 408).

Unlike the above, when the information process module 126 is in the power-off state (Operation 402), the control unit 112 controls the power control unit 110 to cut off the power supply of the main power (Operation 406) and updates the former power control state information stored in the memory unit 114 to the power-off state (Operation 408).

Meanwhile, when the power-off signal is received from the control unit 112 of the display device 100, the control unit 130 of the information process module 126 controls the power control unit 134 to cut off the main power supply (Operation 412). Then, the control unit 130 provides the power control state signal representing the power-off to the control unit 112 of the display device 100 through the power control state detecting unit 128 and updates the former power control state information stored in the memory unit 132 to the power-off state (Operation 416).

When the power-off signal is inputted, the display device 100 is turned off and the information process module 126 is also turned off by detecting the power control state of the information process module 126, thereby synchronizing the power control state of the display device 100 and the information process module according to the signal inputted by the user through the display device 100.

A process for automatically controlling the power according to the former power control state when AC power is applied will now be described with reference to FIG. 5.

When the AC power is inputted (Operation 500), the power unit 102 of the display device 100 converts the AC power into the standby power using the standby power unit 104 and supplies the standby power to each part of the display device 100 including the control unit 112 (Operation 502). Here, the power unit 102 supplies the standby power and the main power to the power control unit 134 of the information process module when the AC power is supplied.

The control unit 112 receiving the standby power reads the former power control state information from the memory unit 114 (Operation 504) and checks if the former power control state information represents the power-on (Operation 506).

When the former power control state represents the power-on, the control unit 112 checks if the information process module 126 is in the power-on state through the power control state detecting unit 128 of the information process module 126 (Operation 508). Here, when the standby and main power is inputted through the power control unit 134, the information process module 126 turns on or off the power according to the power control state information. The power control state signal according to the power on or off state is provided to the control unit 112 of the display device 100 through the power control state detecting unit 128.

When the information process module 126 is not in the power-on state corresponding to the power control state of the display device 100, the control unit 112 transmits the power-on signal to the information process module 126 (Operation 510). Here, the control unit 130 receiving the power-on signal controls the power control unit 134 to supply the main power to each part of the information process module 126, thereby performing the power-on. After the power-on signal is transmitted, the control unit 112 controls the power control unit 110 to supply the main power to each part of the display device 100 (Operation 512).

Unlike the above, when the information process module 126 is in the power-on state corresponding to the power control state of the display device 100 (Operation 508), the control unit 112 controls the power control unit 110 to supply the main power to each part of the display device 100 without transmitting the power-on signal to the information process module 126 (Operation 512).

When the former power control state information stored in the memory unit 114 of the display device 100 represents the power-off in Operation 506, the control unit 112 checks if the information process module 126 is in the power-on state using the power control state signal transmitted from the power control state detecting unit 128 of the information process module to the pins of the connector (Operation 514).

When the information process module 126 is in the power-on state that does not correspond to the power control state of the display device 100, the control unit 112 transmits the power-off signal to the control unit 130 of the information process module 126 and maintains the current standby state (Operation 516).

Unlike the above, when the information process module 126 is in the power-off state corresponding to the power control state of the display device 100, the current standby state is maintained.

As described above, when the AC power is inputted, the control unit 112 of the display device 100 turns on or off the power of the display device 100 according to the former power controls state. In addition, the control unit 112 of the display device 100 detects the power control state of the information process module 126 and transmits power on or off signal to the information process module 126 in response to the power-on or off of the display device 100.

The operation of the information process module 126 according to the input of the AC power will now be described with reference to FIG. 6.

When the AC power is inputted and the standby and the power control unit 102 of the display device inputs the standby and main power to the power control unit 134, the power control unit 134 supplies the standby power to each power of the information process module including the control unit 130 (Operations 600 and 602). The control unit 130 receiving the standby power reads the former power control state information from the memory unit 132 (Operation 604) and checks if the former power control state information represents the power-on (Operation 606).

When the former power control state represents the power-on, the control unit 130 controls the power control unit 134 to supply the main power to the video signal process unit 136 of the information process module 126, the HDD 140, the external flash memory 142. Therefore, the power control unit 134 provides the main power from the power unit 102 of the display device 100 to each part of the information process module 126, thereby performing the power-on (Operation 608).

The control unit 130 provides the power control state signal representing the power-on to the control unit 112 of the display device 100 through the power control state detecting unit 128 (Operation 610).

In the power-on state, the control unit 130 checks if the power-off signal is received from the control unit 112 of the display device 100 (Operation 612). When the power-off signal is received, the control unit 130 controls the power control unit 134 not to supply the main power to each part of the information process module 126. Therefore, the power control unit 134 cuts off the supply of the main power that has been supplied to each part of the information process module 126, thereby performing the power-off (Operation 614).

After the power-off is performed, the control unit 130 transmits the power control state signal to the control unit 112 of the display device 100 through the power control state detecting unit 128 (Operation 616). The control unit 130 updates the former power control state information stored in the memory unit 132 to the power-off state (Operation 618).

Unlike the above, when the former power control state information represents the power-off (Operation 606), the control unit 130 maintains the current state and provides the power control state signal representing the power-off to the control unit 112 of the display device 100 through the power control state detecting unit 128 (Operation 620).

In a state where the power controls state signal representing the power-off is outputted, the control unit 130 checks if the power-on signal is received from the control unit 112 of the display device 100 (Operation 622). When the power-on signal is received, the control unit 130 controls the power control unit 134 to input the main power to the video signal process unit 136, HDD 140, external flash memory 142 of the information process module 126. Therefore, the power control unit 134 supplies the main power from the power unit 102 of the display device to each part of the information process module 126, thereby performing the power-on (Operation 624).

After the power-on is performed, the control unit 130 transmits the power control state signal representing the power-on to the control unit 112 of the display device 100 through the power control state detecting unit 128. Then, the control unit 130 updates the former power control state information stored in the memory unit 132 to the power-off state (Operation 628).

Meanwhile, the information process module 126 may be turned off due to, for example, end of Windows. In this case, the display device 100 performs the power-off according to the power control state of the information process module 126. This will be described in more detail hereinafter.

The control unit 130 of the information process module 126 checks if there is a power-off request due to, for example, the end of the Windows (Operation 700). When the power-off is requested, the control unit 130 controls the power control unit 134 so as not to provide the main power to the information process module 126. As a result, the power control unit 134 cuts off the supply of the main power to each part of the information process module 126, thereby realizing the power-off (Operation 702).

When the power-off is completed, the control unit 130 updates the former power control state information to the power-off state (Operation 704) and transmits the power control state signal representing the power-off to the control unit 112 of the display device 100 through the power control state detecting unit 128 (Operation 706).

Meanwhile, in the power-on state, the control unit 112 of the display device 100 operates an internal timer to check if a predetermined time has lapsed (Operation 708).

Each time the predetermined time has lapsed, the control unit 112 checks if the power control state signal provided through the power control state detecting unit 128 of the information process module 126 represents the power-off (Operation 710).

When the power control state signal represents the power-off, the control unit 112 controls the power control unit 110 to cut off the supply of the main power to each part of the display device 100. As a result, the power control unit 110 performs the power-off (Operation 712). Then, the control unit 112 updates the former power control state information of the memory unit 114 to the power-off state (Operation 714).

In the preferred embodiment of the present invention, although a case where only the supply of the main power to the display unit 124 is briefly described, the main power supply process may vary according to the display unit 124 that is the display module. This is determined considering the normal operation of the display module and the effective main power consumption.

First, the main power supply process in a case an LCD module is provided as the display module will now be described with reference to FIG. 8.

The LCD module 804 includes inverters 806 and 808 for driving lamps 810 and 812 and a main board 814 for driving a liquid crystal panel 816.

When there is a main power supply request to the LCD module 804, a control unit 800 controls a power control unit to supply the main power to the main board 814 and then to the inverters 806 and 808.

By supplying the main power to the main board 814 and then to the inverters 806 and 808, the lamp having the greatest power consumption is the last to be driven, thereby suppressing the unnecessary power consumption.

The main power supply process in the case where the PDP module is used as the display module will now be described with reference to FIG. 9.

A PDP module includes a PDP control board 904 and a plurality of electrodes (scan, sustain and address electrodes) 906 arranged along Y, Z and X-axes.

When there is a main power supply request to the PDP module, a control unit 900 controls a power control unit 902 to supply the main power to the PDP control board 904 and the electrodes 906 in this order. When the PDP control board 904 is normally operated by the supply of the main power, i.e., when a display enable signal of a control IC of the PDP control board 904 is outputted, the control unit 900 determines that the image can be formed through the PDP module and thus control the power control unit 902 to supply the main power to a video signal process unit 908.

As described above, since the main power is supplied to the video signal process unit 908 in a state where the PDP control board 904 can normally form the image, the PDP module does not display the abnormal image.

The embodiment of the present invention includes a computer readable medium containing a program commander for performing the operation realized by a variety of computers. The computer readable medium may be a program commander, a data file, a data structure, or a combination thereof. The program commander of the medium may be specifically designed for the present invention or may be a well-known program in the art.

According to the present invention, even when only one power unit is provided, the display device and the device can normally operate by synchronizing the power control state of the display device and the device that can be detachably mounted in the display device.

In addition, the power can be supplied to a display device and an information process module formed by a device that can be detachably mounted in the display device and the display device and the information process module can normally operated by synchronizing the power control states of the display device and the information process module.

Furthermore, the user convenience can be improved by detecting a former power control state when AC power is inputted in a state where the AC power source is turned off and controlling the power of a display device and an information process module in response to the former power control state.

In addition, the power consumption can be reduced by, when a power source of the information process module formed by a device that can be detachably mounted in a display device, turning off the display device in response to the power-off of the information process module.

It will be apparent to those skilled in the art that various modifications and variations can be made in the present invention. Thus, it is intended that the present invention covers the modifications and variations of this invention provided they come within the scope of the appended claims and their equivalents.

INDUSTRIAL APPLICABILITY

The present invention can be applied to the display device.

The invention claimed is:

1. A power supply apparatus for a display device, comprising:
   a power unit configured to convert AC power into standby power and configured to supply the standby power to each part of the display device, and configured to supply the standby power and main power to an information process module that is connected to the display device;
   a memory device for storing previous power control state information of the display device; and
   a control unit configured to compare the previous power control state information stored in the memory with power control state information received from the information process module, and transmitting a power control signal corresponding to the previous power control state information to the information process module if the previous power control state information of the display device and the power control state information of the information process module do not coincide.

2. The power supply apparatus according to claim 1, wherein the control unit controls the power unit to detect the power control state of the information processing module at a predetermined time interval.

3. The power supply apparatus according to claim 1, installed in the display device.

4. The power supply apparatus according to claim 1, wherein the power unit supplies the AC power to the control unit and a user interface unit, converts the AC power into the standby power for driving the memory unit, and supplies the standby power to the control unit, the user interface unit, and the memory unit.

5. The power supply apparatus according to claim 1, wherein the display device includes a main board for driving a liquid crystal panel and a display module having an inverter for driving a lamp; and
   the control unit supplies the main power to the main board and then to the inverter.

6. The power supply apparatus according to claim 1, wherein the display device includes a PDP (Plasma Display Panel) control board and a PDP module having a plurality of electrodes; and the power unit supplies the main power to the PDP control board and then to the electrodes.

7. An information process module that is formed in a device type installed in a display device, comprising:

a power control unit configured to receive standby power and main power from the display device when AC power is supplied to the display device, and configured to supply the standby power to each part of the information process module;

a power control state detecting unit configured to output power control state information to the display device; and a control unit configured to control the power control unit to supply or cut off the supply of the main power to the information process module according to the power control signal received from the display device, wherein the power control signal is received from the display device when a previous power control state information of the display device and the power control state information of the information process module do not coincide, the received power control signal corresponding to the previous power control state information of the display device.

8. The information process module according to claim 7, further comprising a memory device for storing the previous power control state information, wherein the control unit controls the power control unit to supply or cut off the supply of the main power to the information process module according to the previous power control state information stored in the memory device whenever the AC power is inputted and updates the previous power control state information whenever the power control state varies.

9. The information process module according to claim 7, wherein the power control unit receives standby power from the display device and supplies the standby power to the control unit, memory unit, and the power control state detecting unit.

10. The information process module according to claim 7, wherein the power control state detecting unit comprises a switching device for connecting two pins of a connector coupled to the display device according to a control of the control unit.

11. A display device having an information process module, comprising:

a power unit, in response to AC power being supplied thereto, configured to convert the AC power into standby power to supply the standby power to each component of the display device, and configured to supply the standby power and main power to the information process module;

a user interface unit for receiving a power control command signal from a user;

a memory device that stores a previous power control state information of the display device;

a first controller configured to supply or cut off the supply of the main power to each component of the display device according to the power control command signal, to compare the previous power control state information stored in the memory with power control state information received from the information process module, and to transmit a power control signal corresponding to the previous power control state information to the information process module if the previous power control state information of the display device and the power control state information of the information process module do not coincide; and a second controller configured to control the power control unit to supply or cut off the supply of the main power to the information process module according to the power control signal received from the first controller and configured to provide the power control state information corresponding to a state of the main power supplied to the information process module to the first controller.

12. The display device according to claim 11, further comprising a video process unit for processing a video signal into an output format and a display module comprising a main board for driving a liquid crystal panel and a display module having an inverter for driving a lamp, wherein the first controller controls the power unit to supply the main power to the main board and then to the inverter.

13. A method for supplying power to a display device, the method comprising:

converting AC power into standby power to supply the standby power to each component of the display device when the AC power is supplied;

supplying the standby power and main power to an information process module that is connected to the display device;

receiving a power control state information from the information process module;

comparing a previous power control state information of the display device stored in a memory with the received power control state information from the information process module; and transmitting a power control signal corresponding to the previous power control state information to the information process module if the previous power control state information of the display device and the power control state information of the information process module do not coincide.

14. The method according to claim 13, further comprising detecting the power control state of the information process module whenever a predetermined time has lapsed in a state where the display device is turned on; and controlling the power of the display device in response to the power control state of the information process module.

15. The method according to claim 13, wherein the display device includes a main board for driving a liquid crystal panel and a display module having an inverter for driving a lamp, and wherein the power is supplied to the main board and then to the inverter.

16. The method according to claim 13, wherein the display device includes a PDP (Plasma Display Panel) control board and a PDP module having a plurality of electrodes; and the power is supplied to the PDP control board and then to the electrodes.

17. A method for supplying power to an information process module that is provided in a device installed in a display device, the method comprising:

receiving standby power and main power from the display device, when AC power is supplied to the display device;

supplying the standby power to each part of the information process module;

outputting a power control state information to the display device;

receiving a power control signal corresponding to previous power control state information of the display device from the display device, when the previous power control state information of the display device and the power control state information of the information process module do not coincide; and controlling the power control unit to supply or cut off the supply of the main power to the information process module according to the received power control signal.

18. The power supply method according to claim 17, further comprising controlling the power of the information process module according to the previous power control state information stored in a memory of the display device when power is supplied from the display device in a state where the power of the information process module is turned off.

19. A power supply apparatus, comprising:
a display including a power source configured to supply power to the display, a first storage device that stores an operating state of the display, and a first controller configured to control power supplied to the display; and
a processing module coupled to the display including a second storage device that stores an operating state of the processing module, and a second controller configured to control power supplied to the processing module, wherein
the power supplied to the display and the processing module are independently controlled, and
the first controller synchronizes power supplied to the display and the processing module based on the operating state of the display stored in the first storage device and the operating state of the processing module stored on the second storage device.

20. The power supply apparatus of claim 19, wherein the processing module receives power from the display.

21. The power supply apparatus of claim 19, wherein the processing module is removably inserted into a slot provided on the display and configured to receive power from the display.

22. The power supply apparatus of claim 19, wherein
the first controller compares the stored operating states of the display and the processing module, and
if the stored operating states of the display and the processing module are different, the first controller synchronizes the operating states of the display and the processing module by controlling the second controller to change the operating state of the processing module.

23. The power supply apparatus of claim 19, wherein the power supplied is synchronized by changing the operating state of the processing module to the operating state of the display.

24. The power supply apparatus of claim 19, wherein the second controller periodically transmits the stored operating state of the processing module to the first controller of the display.

25. The power supply apparatus of claim 19, wherein the first controller powers on or powers off the processing module based on a power on or power off instruction received at the display.

26. The power supply apparatus of claim 19, wherein the processing module is removably inserted into a slot provided on the display and configured to receive power from the display.

* * * * *